United States Patent [19]

Abo et al.

[11] Patent Number: 4,750,103
[45] Date of Patent: Jun. 7, 1988

[54] SYSTEM AND METHOD FOR DETECTING AND CONTROLLING KNOCKING IN AN INTERNAL COMBUSTION ENGINE

[75] Inventors: Toshimi Abo, Yokohama; Hiroyuki Naito, Fujisawa; Hatsuo Nagaishi; Kunifumi Sawamoto, both of Yokosuka; Tatsuo Morita, Yokohama; Yoshihisa Kawamura, Yokosuka, all of Japan

[73] Assignee: Nissan Motor Company, Limited, Kanagawa, Japan

[21] Appl. No.: 749,478

[22] Filed: Jun. 27, 1985

[30] Foreign Application Priority Data

Jun. 29, 1984 [JP] Japan .................................. 59-132994
Feb. 8, 1985 [JP] Japan .................................. 60-24144

[51] Int. Cl.⁴ ............................................. F02D 41/04
[52] U.S. Cl. .............................. 364/431.08; 123/425; 123/435; 73/35
[58] Field of Search ................... 364/431.08; 123/425, 123/435; 73/35

[56] References Cited

U.S. PATENT DOCUMENTS

| | | | |
|---|---|---|---|
| 4,012,942 | 3/1977 | Harned ................................ | 123/425 |
| 4,063,538 | 12/1977 | Powell et al. ........................ | 123/425 |
| 4,225,925 | 9/1980 | Hattori et al. ....................... | 364/431 |
| 4,271,799 | 6/1981 | Kato et al. ........................... | 123/425 |
| 4,517,945 | 5/1985 | Ishigami et al. ..................... | 123/425 |
| 4,517,952 | 5/1985 | Hosoya ................................ | 123/638 |
| 4,523,566 | 6/1985 | Kobayashi ........................... | 73/35 |
| 4,582,032 | 4/1986 | Hara et al. ........................... | 123/339 |
| 4,584,869 | 4/1986 | Frodsham ............................ | 73/35 |
| 4,640,249 | 2/1987 | Kawamura et al. ................. | 123/425 |
| 4,640,250 | 2/1987 | Hosaka et al. ....................... | 123/425 |
| 4,658,787 | 4/1987 | Takizawa ............................ | 123/418 |
| 4,658,789 | 4/1987 | Morita ................................. | 123/422 |
| 4,660,535 | 4/1987 | Asano ................................. | 123/425 |

FOREIGN PATENT DOCUMENTS 2813574 10/1978 Fed. Rep. of Germany .
3308541 9/1984 Fed. Rep. of Germany ......... 73/35
2053348 2/1981 United Kingdom ................ 73/35

Primary Examiner—Parshotam S. Lall
Assistant Examiner—V. N. Trans
Attorney, Agent, or Firm—Foley & Lardner, Schwartz, Jeffery, Schwaab, Mack, Blumenthal & Evans

[57] ABSTRACT

A system for detecting and controlling an engine knocking the determination of occurrence of knocking is based on a present data on the detected pressure vibration energy in a combustion chamber of the engine and a value associated with a previous data on the detected pressure vibration energy in the combustion chamber so that an accurate detection of engine knocking can always be achieved. Furthermore, the knocking can be discriminated from the background noise even when the engine revolution speed is high.

25 Claims, 16 Drawing Sheets

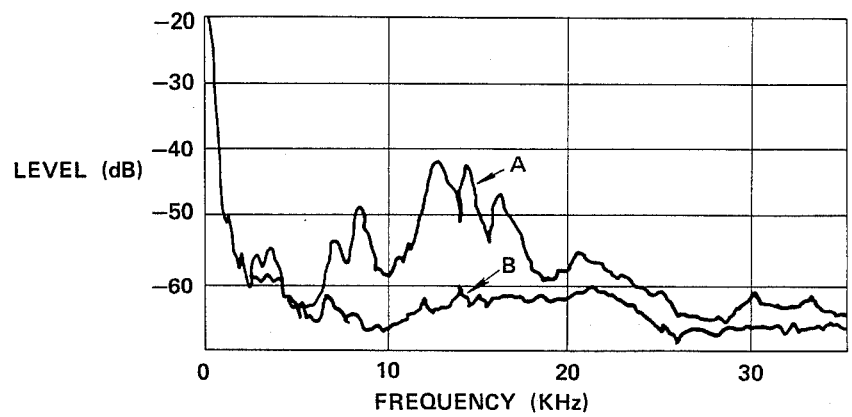

(A)

(B)

TO AN IGNITION SIGNAL DISTRIBUTOR OF AN IGNITION CIRCUIT

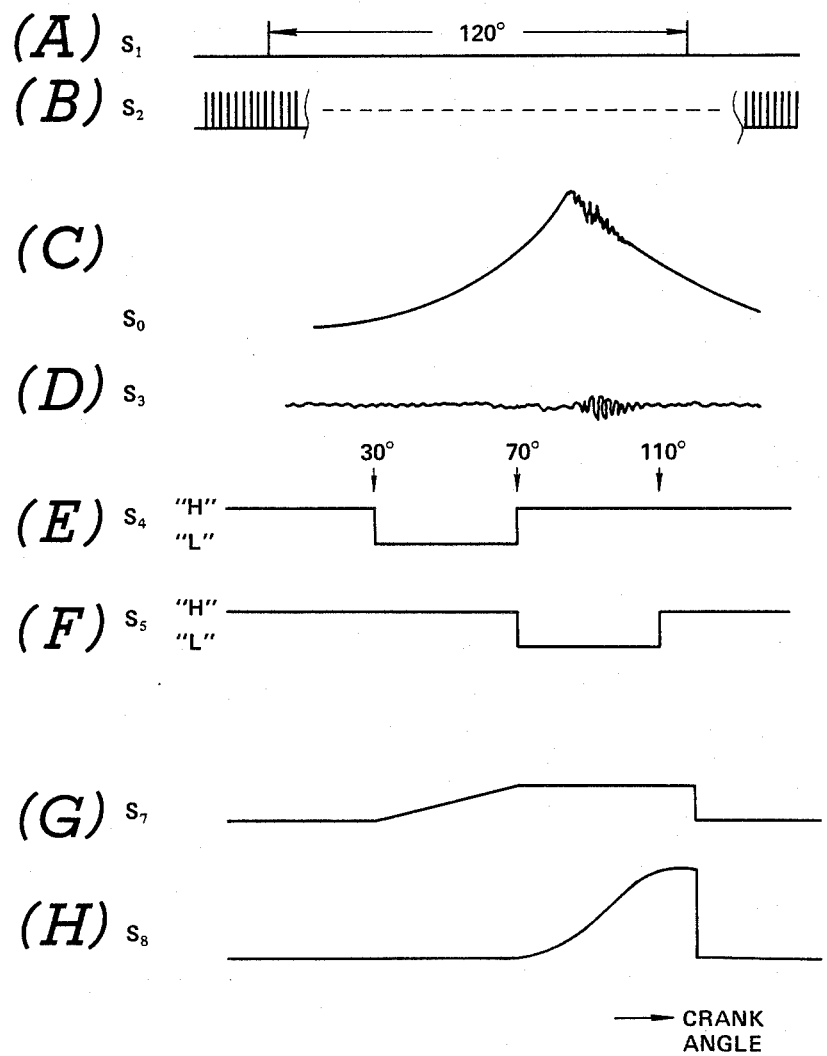

SYSTEM AND METHOD FOR DETECTING AND CONTROLLING KNOCKING IN AN INTERNAL COMBUSTION ENGINE

BACKGROUND OF THE INVENTION

The present invention relates to a system for detecting and controlling a knocking generated in an internal combustion engine.

In general, a knocking phenomenon (also called knock) which appears in an internal combustion engine refers to an abnormal combustion due to early ignition of uncombusted air fuel mixture (called end gas) within an engine cylinder and consequently the abnormal combustion appears in a form of resonant vibration in pressure in the engine cylinder (cylinder pressure) having a plurality of inherent frequencies determined by the dimensions of the cylinder (particularly cylinder bore inner diameter) and combusted gas temperatures.

The inherent frequencies fall in a range approximately from 5 to 6 kilohertz or more.

Such pressure vibration propagates in air via a cylinder wall and cylinder block, etc., and is received by a human's hearing organ as an uncomfortable high-frequency sound. This is called a knocking sound.

Such a knocking phenomenon appears remarkably in a case when the engine load is above a constant value and the ignition timing is too advanced at an angle earlier than a normal ignition advance angle value. Such a strong knock causes uncomfortable noise and a strong vibration within the cylinder. Consequently, an abnormal high temperature in an inner part of the cylinder is generated due to a columnar vibration caused by the strong knocking so that the engine suffers damage.

However, a low level of knocking phenomenon itself does not have an adverse effect on the engine body and engine output characteristics. If the ignition timing is advanced and such low level of knocking appears, combustion efficiency of the engine increases so that fuel consumption can be improved. Therefore, it is preferable to allow and leave the engine at an appropriate level of knocking in order to achieve an engine driving condition with an optimum combustion efficiency of the engine in view of improvement of fuel consumption.

To enhance the driving efficiency of the engine and to suppress noise level due to the knock below a predetermined level, it is necessary to control so that the level of knocking matches various engine operating conditions.

Conventional knocking detection and control systems of internal combustion engines are carried out in such a way that knocking generated due to the abnormal combustion of the engine is detected by means of knocking detecting means comprising a pressure sensor and the result of detection, i.e., a level of knocking is compared with a predetermined reference value so that the presence or absence of knocking is determined. In addition, the ignition timing is then adjusted on the basis of the determination result so that the recurrence of knocking is avoided and an appropriate fuel combustion is carried out.

In this case, however, the above-described knocking detecting means not only detects the knocking proper but also detects variations in pressure within each engine cylinder involved in the normal combustion and in pressure involved in acceleration and deceleration of engine. In addition, such background noise caused by variations in pressure is not fixed but fluctuates with time depending on various engine operating conditions. Furthermore, since an output characteristic of the knocking detecting means has deviations, this results in the background noise. The avoidance of recurrence of knocking depends mainly on how accurate the knocking is discriminated from such background noise.

To cope with such a conventional problem as described above, various systems for detecting and controlling the knocking in the engine have been proposed.

Japanese Patent Application Unexamined Open No. Sho 59-39,972 published on Mar. 5, 1984 exemplifies such a system as described above. In the system disclosed in the above-identified document, an average value of the output level of the knocking means for a predetermined interval of a crank angle (for a predetermined angle through which an engine crankshaft has rotated) is used as the background noise level and the background noise level multiplied by k (constant number) is set as a first reference value. The system then compares a maximum value of the output level of the knocking detecting means for the predetermined interval of the crankshaft rotation with the first reference value.

When the maximum value thereof is greater than the first reference value, the system determines the occurrence of knocking and retards the ignition timing by a predetermined retardation angle. In addition, the system compares the maximum value thereof with a predetermined second reference value which is fixed and determines the occurrence of knocking when the maximum value described above is greater than the second reference value, thus adjusting the ignition timing so as to retard it by the retardation angle. In this way, the system controls the ignition timing so as to shift the ignition timing toward retardation with respect to the current timing when the maximum value thereof is greater than the first or second reference value. It should be noted that the mean value of the output level of the knocking detecting means is derived from a value of an output integrated signal of an integration circuit after rectification of an output waveform of the knocking detecting means by means of a rectifier.

However, there is a problem in the system disclosed in the above-identified document. That is to say, since the average value of the output level of the knocking detecting means which is multiplied by the constant number is used as the reference value to be compared, a high level of background noise continues for a long duration even though no knocking occurs in a range of high engine revolution speeds. In addition, since the level of background noise is rapidly changed depending on the engine operating condition, the reference value (first reference value) is set at a high-level value so that it is impossible to discriminate accurately the knocking noise from the background noise. Consequently, accurate avoidance and suppression for recurrence of knocking cannot sufficiently be achieved. Therefore, the maximum output torque of the engine cannot sufficiently be obtained with noisy knock sounds being generated, thus the engine durability is reduced.

On the other hand, Japanese Patent Application Examined Open No. Sho 58-13,749 published on Mar. 15, 1983 exemplifies the other knocking detecting means.

The knocking detecting means disclosed in the above-identified document comprises a knock sensing block including a pressure-responsive sensor installed at a spark plug as a washer thereof, a signal amplifier, a low-pass filter, an average circuit having an envelope processing circuit of knocking signal, a comparator, and an ignition timing control circuit.

In the disclosed system of No. Sho 58-13,749, a signal component having a particular frequency band equal to or more than approximately five or six kilohertz of the detected signal corresponding to the internal cylinder pressure is extracted as a knocking signal and the knocking signal is then processed in a peak value detection circuit to produce an envelope signal. The envelope signal is assumed as a signal corresponding to knocking energy and is directly compared with a predetermined reference value. The knocking level is then controlled to a desired level by advancing or retarding the ignition timing on the basis of the comparison result.

However, there is also a problem in the knocking detecting means disclosed in the above-identified document as will be described in details below.

In general, the above-described particular frequency band component is also included in the output signal of the sensor at the time of no occurrence of knocking, i.e., at a time when fluctuations in combustion pressure do not appear.

FIG. 1 shows an example of power spectra of presure vibrations within the engine cylinders in the internal combustion engine. It should be noted that although the spectra shown in FIG. 1 are experimental results when the engine having a four cylinder and displacement of 1800 cc is driven with full load and at 4800 rpm, the substantially same result has been observed in the other different engine models by the Applicants' series of experiments.

Hence, in the conventional system disclosed in the latter document, the determination of the knocking level becomes difficult.

Since FIG. 1 shows such knocking as that having a relatively large level, a difference in the power level between those at the time of no occurrence of knocking A and at the time of occurrence of knocking B is equal to or greater than about 10 dB. However, since the difference is substantially two or three decibels in a state where a trace pattern of knocking which provides a boundary between the determinations of presence and absence of knocking, it is extremely difficult to determine an appearance of such pattern of knocking.

In addition, since the output signal level itself of the pressure-responsive sensor is largely changed during no occurrence of knocking due to an initial characteristic and deterioration of aging effect and due to an influence of mechanical vibration system caused by a load on a sensor element surface or fastening torque in a case when the pressure-responsive sensor is attached to the spark plug, such a level change often becomes larger than that of the output signal due to the influence described above during the occurrence of knocking.

Furthermore, according to experiments by the Applicants using several types of engines, the output variations of the pressure-responsive sensor during no occurrence of knocking are three or four times with respect to an engine load with an engine idling or with a wide open throttle valve and are two or three times with respect to the engine speed of 800 rpm or 4800 rpm.

Since in the conventional detecting means disclosed in the latter document, the signal of the pressure-responsive sensor having such a large variation is directly compared with the reference value, an extraneous number of experiments are needed for each pressure-responsive sensor, for each type of engine, and for each engine operating condition in order to achieve a system which can accurately determine the presence or absence of knocking.

SUMMARY OF THE INVENTION

With the above-described problems in mind, it is an object of the present invention to provide a system for detecting and controlling knocking in an internal combustion engine and method therefor which can accurately detect the presence or absence of knocking irrespective of various factors affecting the detection of engine knocking.

It is another object of the present invention to provide the system for detecting and controlling the knocking and method therefor which can accurately determine an intensity (level) of knocking when determining the occurrence of knocking irrespectively of the background noise.

It is still another object of the present invention to provide the system for detecting and controlling the knocking and method therefor wherein a vibration of a combustion pressure generated during each combustion cycle of the internal combustion engine is detected, physical quantities associated with the combustion vibration energies during both occurrences of non-knocking and knocking derived from the pressure vibrations in the combustion chamber respectively, both reference value and comparison signal value to be compared with each other and derived from these quantities are calculated, and results of the respective calculations are compared with each other so that the presence or absence of knocking is determined.

It is a further object of the present invention to provide the system and method for detecting and controlling the knocking in the internal combustion engine, wherein the output signal of the knocking detecting means is quantified for the predetermined interval in the engine crankshaft rotational angle, the quantified signal is then processed to give a weight mean value of the signal level value, the knocking is then discriminated from the background noise through addition and subtraction between the weight mean value and the current quantified signal value, and the calculated result is compared with a reference value so that the intensity of knocking is accurately measured.

The above-mentioned objects can be achieved by providing a system for detecting and controlling a knocking in an internal combustion engine, comprising: (a) first means for detecting a pressure vibration energy within a combustion chamber of an engine cylinder; (b) second means for determining the occurrence of the knocking on the basis of a present quantity data on the detected pressure vibration energy and a value associated with a previous quantity data on the detected pressure vibration energy.

BRIEF DESCRIPTION OF THE DRAWINGS

A more complete understanding of the present invention may be obtained from the following description taken in conjunction with the attached drawings in which like reference numerals designate corresponding elements and in which:

FIG. 1 is a graph representing power spectra of a combustion chamber pressure vibration in cases of no occurrence of knocking and occurrence of high level of knocking with respect to the frequency thereof;

FIGS. 2(A) and 2(B) are waveform charts of output signals passed through a band-pass filter from a pressure-responsive sensor during occurrence of knocking and no occurrence of knocking, respectively;

FIGS. 3(A) through 3(C) are waveform charts of signals corresponding to an engine crankshaft rotational angle for explaining a basic technique of the present invention;

FIG. 7 is a waveform chart of output signals of each circuit shown in FIG. 6;

DETAILED DESCRIPTION OF THE PREFERRED EMBODIMENTS

Figure 4:
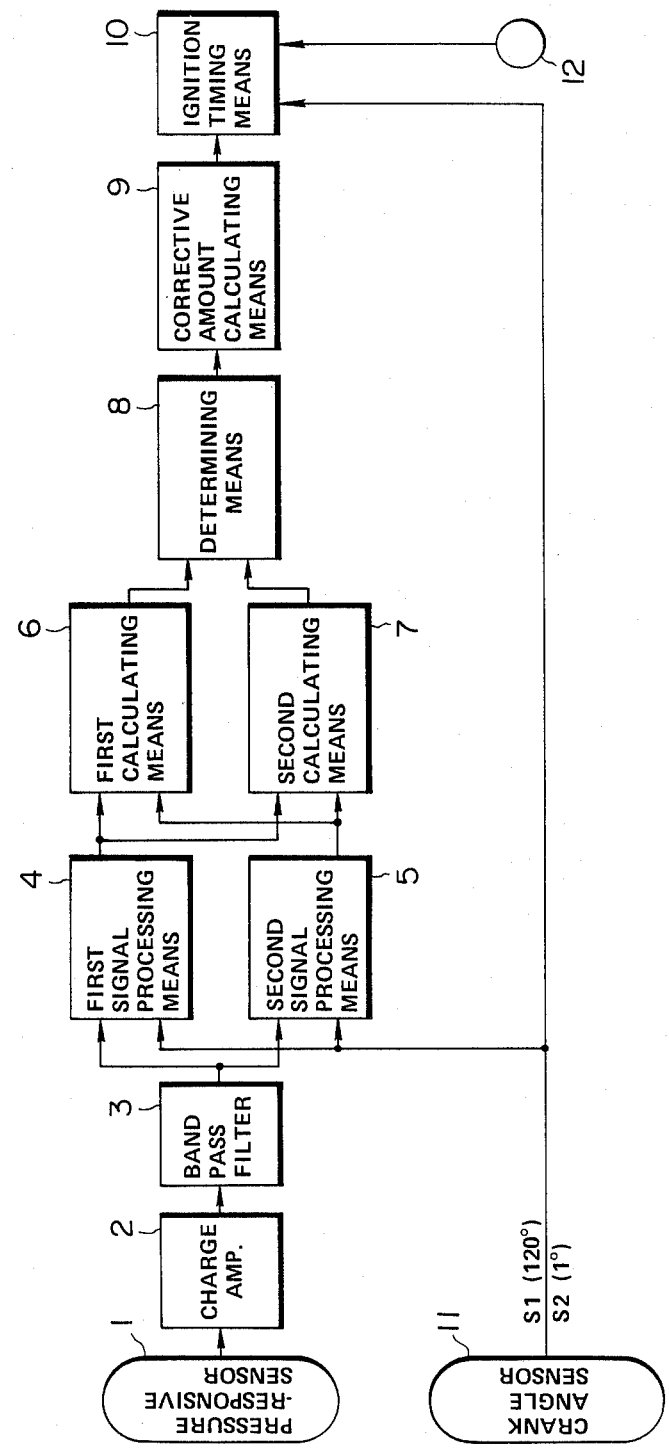
FIG. 4 is a functional block diagram of a first preferred embodiment according to the present invention.

Reference will hereinafter be made to the drawings in order to facilitate understanding of the present invention.

Before explaining a first preferred embodiment, a basic technical background of the first preferred embodiment will be described below with reference to FIGS. 1 through FIG. 3.

As appreciated from FIG. 1, a large difference appears in the power level of the frequency components falling within a particular frequency band at times of occurrence of a high level of knocking (A) as opposed to no occurrence of knocking (B). Therefore, a band-pass filter which enables passage of the particular frequency-band component is used to extract such a frequency component, e.g., ranging from 8 kilohertz to 17 kilohertz in a range of which the power level difference is remarkable as shown in FIG. 1.

FIGS. 2(A) and 2(B) are signal waveforms of the output signal of the pressure-responsive sensor after passing through the band-pass filter. It should be noted that these signal waveforms indicate high-frequency vibrations of the internal cylinders of the engine after a post ignition, respectively.

Power in a particular frequency band, i.e., a mean value of a vibration energy with respect to time can be calculated as follows.

The power of an alternating-current signal x(t) can generally be expressed as:

$$\Phi = (\tfrac{1}{2}T) \int_{-T}^{T} X^2(t) dt \qquad (1)$$

As appreciated from the equation (1), the power $\Phi$ can be derived from an average value of a square of an amplitude of the signal x(t) with respect to time.

Hence, an integration of an absolute value of the signal (x)t shown in FIGS. 2(A) and 2(B) is expressed as follows:

$$\frac{1}{2T} \int_{-T}^{T} |x(t)| dt = \frac{1}{2T} \int_{-T}^{T} \sqrt{x^2(t)}\, dt \qquad (2)$$

Since the right side of the equation (2) indicates a root mean square (RMS) of the signal x(t), the left side of the equation (2) may be considered to indicate a quantity of the power of the signal x(t) or at least a quantity of a one-value function which correlates to the power.

It should be noted that although the signal x(t) of the above-described equations (1) and (2) is assumed merely to be a signal of one basic frequency, the signal x(t) may include a plurality of frequency components.

FIG. 3(A) shows the output signal of the pressure-responsive sensor after the passage of the band-pass filter before and after an ignition of mixture fuel in an engine cylinder is carried out.

FIG. 3(B) shows a signal waveform representing an integrated value of an absolute value of the signal shown in FIG. 3(A) for a compression stroke range starting at 40° before the top dead center (BTDC) in a unit of a crankshaft rotational angle to the top dead center.

FIG. 3(C) shows the similar signal waveform in a subsequent stroke range starting at the top dead center to 40° after the top dead center (ATDC).

It should be noted that FIG. 3(B) and FIG. 3(C) indicate vibration energies of the internal cylinders in the respective ranges in unit of the crankshaft rotational angle, i.e., a crank angle. In other words, the vibration energies obtained through the absolute value integration are represented by the equation (2) in which a term ½T is omitted.

In FIG. 3(B), the signal waveform appearing an interval from 40° BTDC to the top dead center (TDC) indicates an integrated signal at the time of no appearance of knocking. At this interval, the integrated signal level increases substantially linearly and the energy with a constant amplitude is present irrespectively of a position (crankshaft rotational angle value) of crank angle.

That is to say, the following relationship is established if there is no appearance of knocking on the assumption that the top dead center (TDC) is expressed as T=0.

$$\int_{T=-40°}^{0} x(t)dt = \int_{0}^{T=+40°} x(t)dt \quad (3)$$

According to various experiments, the above-expressed relationship (3) may be deemed to be established under almost all engine operating conditions.

It should be noted that the integration interval (in this case, from 40° BTDC to TDC) needs to be carefully selected since an erroneous selection of the integration interval causes no establishment of the relationship in the equation (3) any more due to an influence of vibrations in pressure caused by opening and closing operations of the intake and exhaust valves of the engine.

On the other hand, the integration interval from the top dead center (TDC) to 40° ATDC in FIG. 3(C) indicates an integrated signal during occurrence of knocking. In this case, an incrementation of energy appears caused by knocking in an expansion stroke after the top dead center in the compression stroke.

In general, a determination of knocking level through a hearing organ of a human is considered to be carried out on the basis of a relative difference in intensity between a sound pressure level caused by a background noise generated stationarily and that caused by knocking vibrations.

Hence, if the vibration energy of the internal pressure during no occurrence of knocking is directly compared with that during occurrence of knocking, a detection of knocking level with a high accuracy can be achieved which accords with a functional evaluation of a human organ.

According to the above-expressed relationship (3), since an emprical rule tells that the knocking will not occur before each cylinder piston has reached the top dead center in the compression stroke, the integrated signal formed before the top dead center can be a predictive value of the vibration energy within the internal cylinder pressure in the expansion stroke after the top dead center during no occurrence of knocking, irrespectively of the presence or absence of knocking in the expansion stroke after the piston has reached the top dead center.

Therefore, if a value of a half-wave rectification and integration for the pressure vibrations during a predetermined interval, i.e., within a range of a predetermined crankshaft rotational angle before the top dead center in the compression stroke is compared with that during another predetermined interval, i.e., within a range of a predetermined crankshaft rotational angle after the top dead center in the expansion stroke or within a range of a predetermined crankshaft rotational angle including the range of the above-described predetermined crankshaft rotational angle after and before the top dead center, the vibration energy within the internal cylinder during no occurrence of knocking can directly be compared with the vibration energy within the internal cylinder generated during the combustion stroke of the engine. Consequently, the detection of knocking with an extremely high accuracy can be achieved.

The first preferred embodiment detects the presence or absence of knocking on a basis of the theory of detection described above.

FIG. 4 shows a functional block diagram of the first preferred embodiment together with an ignition timing control system to be described later.

In FIG. 4, numeral 1 denotes pressure-responsive sensor for detecting a pressure vibration in an engine cylinder. The sensor 1 can measure a vibration in pressure within a combustion chamber the engine. Numeral 2 denotes an electric charge amplifier which converts an output electric charge of the sensor 1 into a corresponding voltage, since the sensor 1 comprises, e.g., a piezoelectric type pressure-sensitive element. Numeral 3 denotes a band-pass filter (BPF) which enables passage of a signal component with a frequency falling within a particular frequency band, i.e., from approximately 6 kilohertz to 17 kilohertz. Numerals 4 and 5 denote first signal processing means and second signal processing means for obtaining first and second physical quantities associated with the combustion pressure vibration energies during no occurrence and occurrence of knocking, respectively, from signals corresponding to combustion pressure vibrations detected by the above-described elements 1, 2, and 3, respectively.

Numerals 6 an 7 denote first and second calculating means for calculating a reference value and comparison signal value from either or both first and second physical quantities.

Numeral 8 denotes knock determining means including a comparator which compares the reference value and comparison signal value for determining the presence or absence of knocking.

It should be noted that since the ignition timing control system 10 is combined with the knocking detecting and controlling system, a correction of ignition timing advance angle value calculating means 9 is incorporated into the system 10 which calculates a correction value of an ignition timing advance angle value according to the result of the determination by the knock determining means 8.

Numeral 11 denotes a crank angle sensor which generates a reference signal $S_1$ and unit angle signal $S_2$ (in a case of a six-cylinder engine, the reference signal $S_1$ is generated whenever an engine crankshaft has rotated through 120° and the unit angle signal $S_2$ is generated whenever the engine crankshaft has rotated through, e.g., one degree). Numeral 12 denotes a sensor or sensors for detecting another engine operating parameter or other engine operating parameters of the internal combustion engine.

The construction and operation of each element in the first preferred embodiment will be described below.

The pressure-responsive sensor 1 comprises, e.g., the piezoelectric element which converts pressure during combustion within the engine cylinder into a corresponding amount of electric charge.

Figure 5:
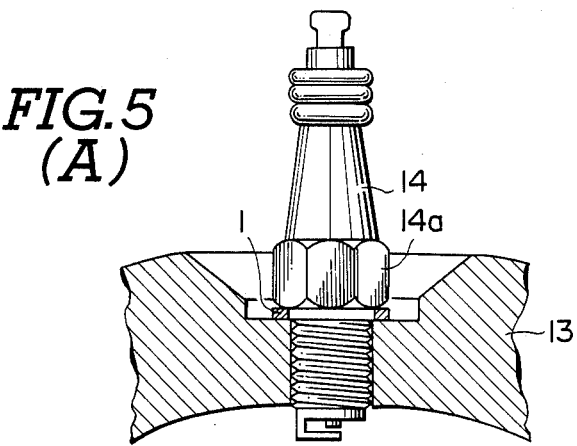
FIGS. 5(A) and 5(B) are sectional and plan views of an internal cylinder pressure-responsive sensor attached to a spark plug installed on a cylinder block shown in FIG. 4.
Figure 5:
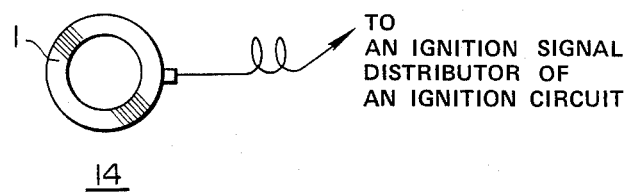

As shown in FIG. 5(A) and FIG. 5(B), the pressure-responsive sensor 1 is formed in a shape of washer for a spark plug 14 and is fixed around an upper end of a threaded portion of the spark plug 14 by means of a fastening part 14a of the spark plug 14 which is received at an outer recess of a cylinder head 13 when the threaded portion of the spark plug 14 is inserted into a threaded hole of the cylinder head 13. As shown in FIG. 5(B), a cable attached to a central electrode of the spark plug 14 is connected to a distributor of an ignition circuit. In addition, another cable is connected to the charge amplifier 2 shown in FIG. 6. For the ignition circuit, Japanese Patent Application Unexamined Open No. Sho 58-82,074 published on May 17, 1983 discloses the ignition circuit, the contents of which is hereby incorporated by reference.

Figure 6:
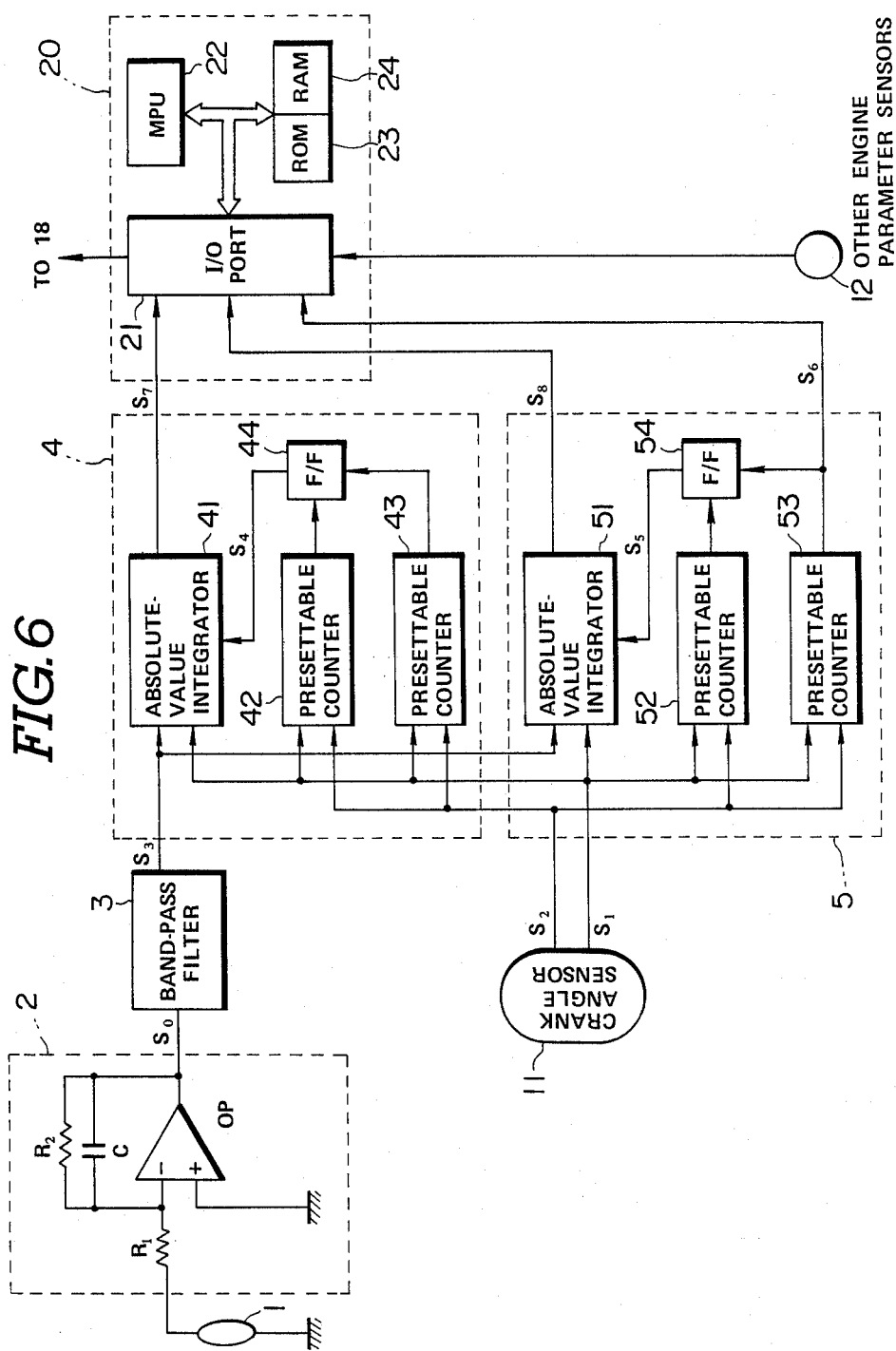
FIG. 6 is a specific circuit block diagram of the first preferred embodiment shown in FIG. 4.

FIG. 6 shows a specific circuit block diagram of the first preferred embodiment according to the present invention.

The electric charge amplifier 2 comprises, e.g., a conventional electric charge-to-voltage converting amplifier including a resistor $R_1$ connected to the pressure-responsive sensor 1, an operational amplifier OP, a capacitor C connected between an inverting input terminal and output terminal, a resistor $R_2$ connected across the capacitor C, with a non-inverting input terminal of the operational amplifier OP being grounded.

Figure 6A:
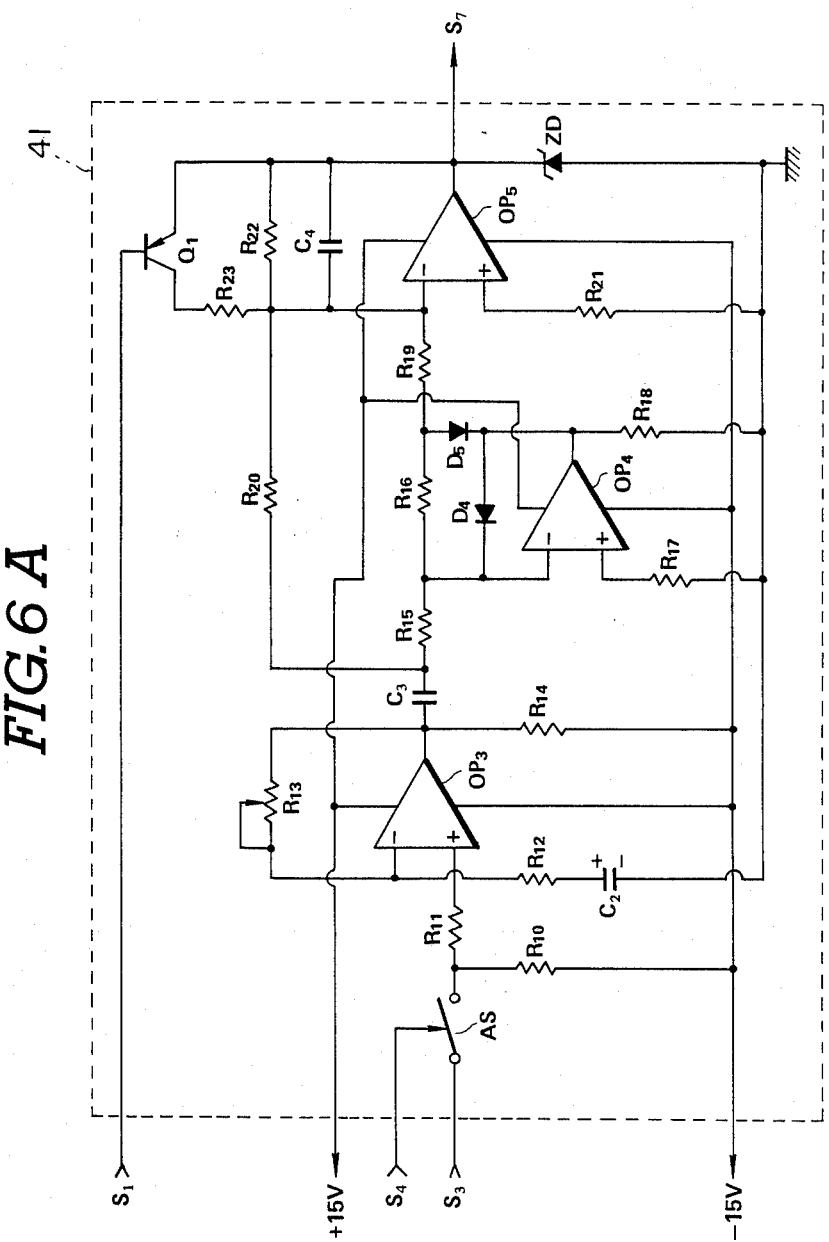
FIG. 6A is an example of internal circuit of an absolute value integration circuit shown in FIG. 6.

The first signal processing means 4 comprises a circuit for detecting vibration energy during no occurrence of knocking in the engine. The circuit 4 comprises: an absolute-value integration circuit 41 which integrates an absolute value of the output signal $S_3$ from the band-pass filter 3, holds and resets the integrated value in response to the reference signal $S_1$ from the crank angle sensor 11. The detailed construction of the absolute-value integration circuit 41 is exemplified by FIG. 6A. Furthermore, the circuit 4 comprises: first and second presettable counters 42, 43 which count the number of pulses in the unit angle signal $S_2$ from the crank angle sensor 11 in response to the reference signal $S_1$ from the crank angle sensor 11. Furthermore, the circuit 4 comprises: a flip-flop circuit (F/F) 44 which controls an operation of the absolute-value integration circuit 1 in response to a level change of the output signal from the first and second resettable counters 42, 43.

On the other hand, the second signal processing means 5 comprises a circuit for detecting the vibration energy during occurrence of knocking. The circuit 5 comprises the absolute value integration circuit 51, third and fourth presettable counters 52 and 53, and flip-flop circuit (F/F) 54.

The first preferred embodiment shown in FIG. 6 is applicable to the six-cylinder engine. In addition, the reference signal $S_1$ is outputted from the crank angle sensor 11, 70 degrees before the top dead center in the compression stroke for one of the cylinders and the respective detections of the vibration energies during occurrence and no occurrence of knocking are carried out between 40 degrees before and after the top dead center in the compression stroke and in the expansion stroke. In these cases, the first and second presettable counters 42 and 43 are preset to values corresponding to 30 degrees and 70 degrees of the crankshaft rotational angles, respectively. The third and fourth presettable counters 52 and 53 are preset to values corresponding to 70 degrees and 110 degrees of the crankshaft rotational angle, respectively.

The first and second calculating means 6, 7 and knock determining means 8, etc., shown in FIG. 4 comprises a microcomputer denoted by 20 in FIG. 6. It should be noted that the microcomputer is used as a control unit as exemplified by Japanese Patent Application Unexamined Open No. Sho 57-212,349, the contents of which is hereby incorporated by reference. In addition, the microcomputer performs functions of correction value calculating means 9, ignition timing controlling means 10, and other various engine operation controlling means such as exhaust gas recirculation rate (ERR) and engine idling speed control and so on.

An input/output interface (I/O Port) 21 constituting the microcomputer performs functions such as analog-to-digital (A/D) conversions of the input signals $S_7$ and $S_8$, transmission of an interrupt signal $S_6$ to an MPU (microprocessor) 22 to be described later, calculation of a final ignition timing value from a basic ignition timing advanced angle value and a correction value to be described later, and transmission of an ignition command signal at the calculated final ignition timing to the ignition circuit 18 (not shown in FIG. 6 but shown in FIG. 9).

Figure 8:
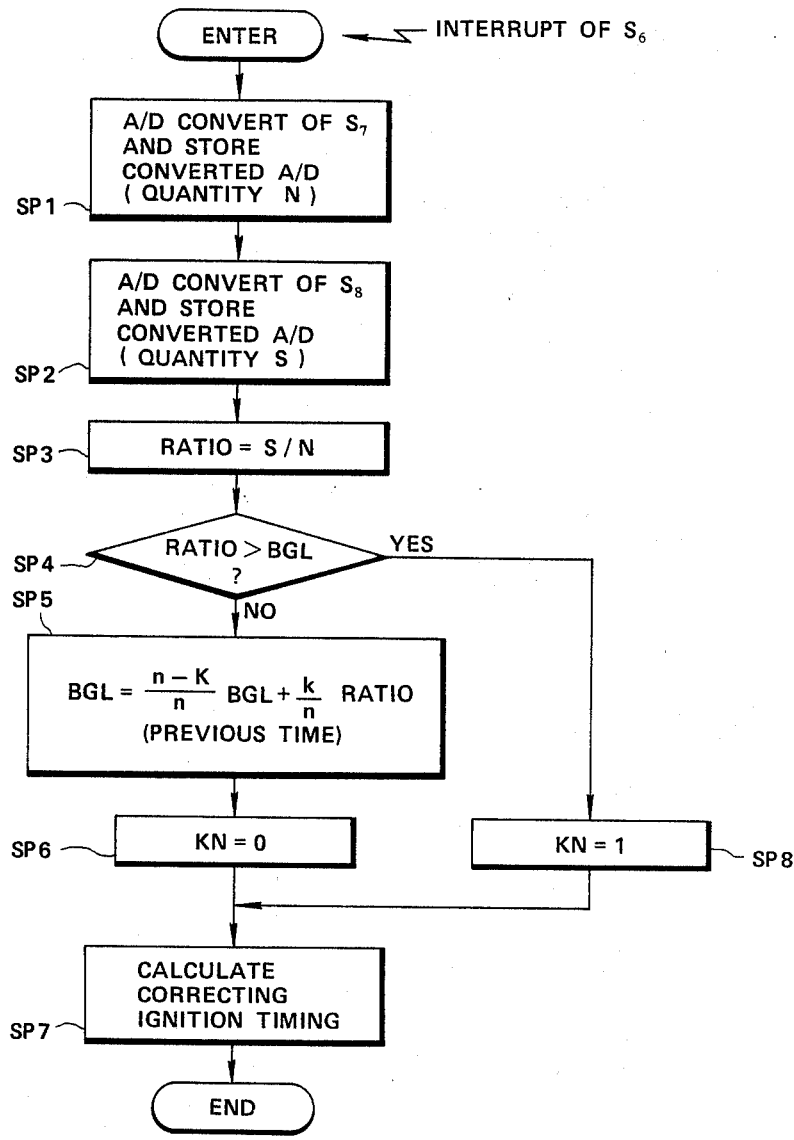
FIG. 8 is a processing flowchart of a program on which a microcomputer shown in FIG. 6 executes.

The MPU 22 executes various processing programs for controlling engine operating conditions, including a processing program shown in FIG. 8.

A read-only memory (ROM) 23 stores the above-mentioned processing programs and a random access memory (RAM) 24 stores temporarily data to be processed.

FIG. 7 shows an example of each signal waveform in the typical circuits shown in FIG. 6 when the crank angle ranges between zero (, i.e., 70° BTDC) and 120 degrees (, i.e., 50° ATDC).

In detail, (A) of FIG. 7 shows the reference signal $S_1$ generated from the crank angle sensor 11 (the period thereof is 120 degrees in the case of the six-cylinder engine). (B) of FIG. 7 shows the unit angle signal $S_2$ generated at the same crank angle sensor 11 having a pulsewidth of one degree in the crank angle (engine crankshaft rotational angle). (C) of FIG. 7 shows the output signal $S_0$ from the charge amplifier 2. (D) of FIG. 7 shows an output signal $S_3$ from the band pass filter 3. (E) of FIG. 7 shows an output signal $S_7$ from the flip-flop circuit (F/F) 44. (F) of FIG. 7 shows an output signal $S_5$ of the flip-flop circuit (F/F) 54. (G) of FIG. 7 shows the output signal $S_7$ of the absolute-value integration circuit (hereinafter referred simply to as integrator) 41. (H) of FIG. 7 shows the output signal $S_8$ of the other integrator 51.

Next, operations of the first and second signal processing means 4, 5 enclosed with broken lines in FIG. 6 will be described below.

First, when the reference signal $S_1$ is generated and sent to the integrators 41, 51, both integrators 41, 1 are reset. At this time, the first, second, third, and fourth presettable counters (hereinafter referred simply to as counters) 42, 43, 52, 53 are preset to the predetermined values (30°, 70°, 70°, and 110°). Thereafter, each counter starts counting the number of pulses in the unit angle signal $S_2$. When the crank angle reaches 30 degrees from 70° BTDC, i.e., the crank angle value which indicates zero (at which the reference signal $S_1$ appears), the output signal of the first counter 42 is inverted. The output signal S4 of the flip-flop circuit (F/F) 44 is, in turn, turned to a low "L" level as shown in (E) of FIG. 7 so that the reset state of the integrator 41 is released to start integration of the output signal S3 of the band-pass filter 3.

Next, when the crank angle reaches 70 degrees, i.e., TDC from 70° BTDC (at which the reference signal S1 is generated), the output signal of the second counter 43 is inverted so that the output signal S4 of the flip-flop circuit (F/F) 44 is in turn turned to a high "H" level. At this time, the integrator 41 holds the instantaneous integrated value. In addition, since the output signal of the third counter 52 is inverted, the output signal S5 of the flip-flop circuit 54 is turned to a low "L" level as shown in (F) of FIG. 4. At this time, the reset state of the integrator 51 is released to start integration of the output signal S3 of the band-pass filter 3.

Since the output signal of the counter 53 is inverted at the time of the crank angle of 110 degrees, the output signal S5 of the flip-flop circuit 54 is turned to the high "H" level so that the integrator 51 holds the instantaneous integrated value.

Hence, the output signal S7 of the integrator 41 changes as shown in (G) of FIG. 7 and, on the other hand, the output signal S8 of the integrator 51 changes as shown in (H) of FIG. 7.

In this way, the first and second signal processing means 4, 5 can obtain the integrated value within the interval from 40 degrees before the top dead center in the compression stroke to the top dead center, i.e., a signal value corresponding to the first physical quantity associated with the vibration energy during no occurrence of knocking and the integrated value within the interval from the top dead center to 40 degrees after the top dead center, i.e., a signal value corresponding to the second physical quantity associated with the vibration energy during occurrence of knocking.

It should be noted that the output signal S6 of the fourth counter 53 when the crank angle reaches 110° from a time when the reference signal S1 is generated is used as an interrupt signal for the microcomputer 20 so that the microcomputer 20 performs an initialization for the start of A/D conversion to be described later.

FIG. 8 shows an interrupt processing routine of the microcomputer 20 shown in FIG. 6.

When an interrupt request from the signal S6 is issued to the microcomputer 20, the microcomputer 20 starts to execute the interrupt routine shown in FIG. 8.

In a first step SP1, the MPU 22 stores digital data which is an A/D conversion of the output signal S7 of the integrator 41 into a predetermined address in the RAM 24 as the first physical quantity N associated with the vibration energy during no occurrence of knocking.

In second step SP2, the MPU 22 in turn stores a digital data which is an A/D conversion of the output signal S8 of the integrator 51 into another predetermined address in the RAM 24 as the second physical quantity S associated with the vibration energy during occurrence of knocking.

In a third step SP3, the MPU 22 calculates a comparison signal value RATIO, in this example, second quantity S per first quantity S/N.

On the other hand, a reference value BGL to be compared with the RATIO is calculated in this example as an addition of a weight mean value of the RATIO, i.e., addition of the previous BGL and current RATIO to the respective values of which (n−k/n) and k/n are weighted. The current BGL is thus expressed as $BGL = (n-k)/n \times$ previous value of $BGL + k/n \times$ present value of RATIO, wherein k and n are constant numbers. This equation is calculated in a step SP5 and the previous BGL is updated to the current BGL.

In a step SP4, the MPU 22 reads the previous reference value BGL and compares it with the comparison signal value RATIO calculated now in the step SP3.

If RATIO≦BGL, the routine goes to the step SP5 since the MUP 22 determines that knocking has not occurred. In the step SP5, the reference value BGL to be used in the next processing cycle is calculated and stored to update the previous BGL as described above.

In a step SP6, the MPU 22 sets a flag KN indicating occurrence of knocking to zero (KN=0).

In a step SP7, thereafter, the MPU 22 executes the calculation of a correction value of the ignition timing advanced angle value.

On the other hand, if RATIO>BGL in the step SP4, the MPU 22 determines that knocking has occurred and the routine goes to a step SP8, wherein the flag KN is set to one (KN=1). Thereafter, the routine goes to the step SP7.

It should be noted that it is preferable that updating of the reference value BGL is not carried out when the occurrence of knocking is determined since the reference value BGL is a measure of no occurrence of knocking. This is because the reference value BGL becomes larger if an update operation of the value BGL is made when knocking has occurred, i.e., when the value of RATIO is large. If the value BGL becomes large, the determination of the presence or absence of knocking becomes impossible if such updatings are repeated irrespective of the occurrence of knocking.

Furthermore, although in the first embodiment shown in FIG. 8 the comparison signal value RATIO is calculated as the ratio of second and first physical quantities S and N (S/N), the comparison signal value RATIO may be calculated as a difference between the second and first physical quantities (S−N), or alternatively as a ratio of the above-calculated difference (S−N) to the first physical quantity N, i.e., (S−N)/N. In addition, the reference value BGL is calculated in this embodiment as a value associated with the weight mean value of the comparison signal value RATIO, the reference value BGL may be calculated as a mean value of the comparison signal value RATIO for a latest predetermined engine cycle, or alternatively a mean value of the first physical quantity N for the latest predetermined engine cycle or a weight mean value thereof.

Figure 9:
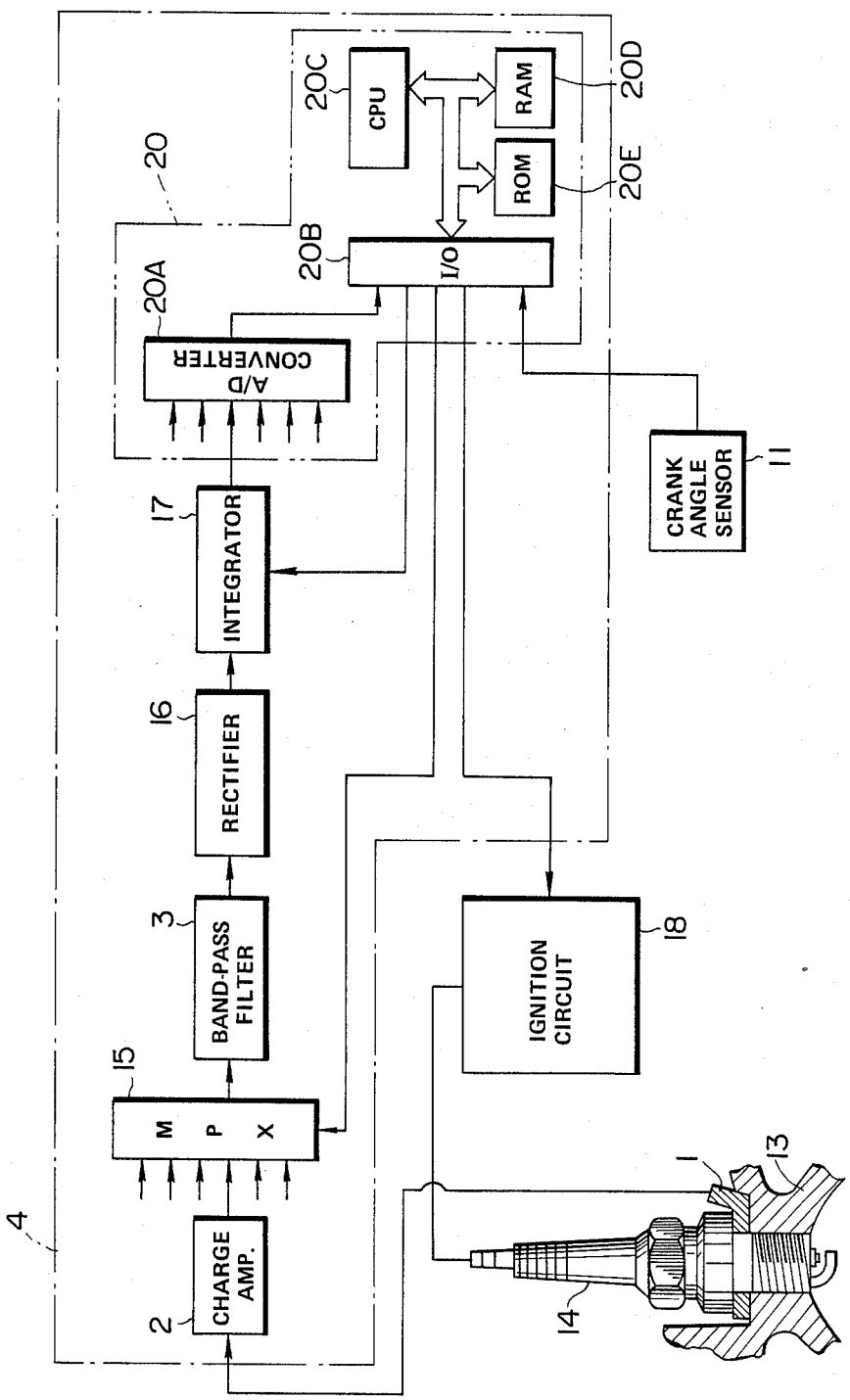
FIG. 9 is a specific circuit block diagram of a second preferred embodiment according to the present invention.

FIG. 9 shows a circuit block diagram of a second preferred embodiment which is applicable to a multi-cylinder internal combustion engine.

In FIG. 9, the charge amplifier 2 is provided for each pressure-responsive sensor 1 which is fixed to the corresponding spark plug 14, as described above with reference to FIGS. 5(A) and 5(B).

A multiplexer 15 receives the signal from each charge amplifier 2 and outputs a signal waveform detected by each pressure-responsive sensor 1 for a predetermined interval of crank angle in a time shared mode is response to a series of command signals from a microcomputer 20. It should be noted that the predetermined interval in unit of crank angle is set to an interval during which the knocking and background noise for each engine cylinder can sufficiently be detected (for example, an interval from 70 degrees before the top dead center in the compression stroke to 70 degrees after the top dead center in the expansion stroke).

A rectifier 16 rectifies a signal component passed through the band-pass filter 7. The integrator 17 integrates the rectified signal for the predetermined interval of the crankshaft rotational angle, start and completion of the integration being controlled by the microcomputer 20. In this embodiment, the start of integration is at 10° after top dead center and the completion thereof is at 50° after top dead center. The microcomputer 20 comprises an analog-to-digital (A/D) converter 20A, an input/output (I/O) port 20B, a central processing unit (CPU) 20C, a random-access memory (RAM) 20D and read-only memory (ROM) 20E as substantially in the same construction as in the first embodiment.

It should be noted that the A/D converter 20A converts the integrated value of the integrator 17 into a corresponding digital signal and sends the digital signal to the I/O port 20B, the I/O port 20B receives the digital signal from the A/D converter 20A, receives a crank-angle representation signal from the crank angle sensor 11, and outputs a control signal to the multiplexer 15 and integrator 17. The CPU 20C reads necessary external value via the I/O port 20A in accordance with a program stored in the ROM 20E, executes arithmetic operation processings of data which are transferred from and to the RAM 20D, and outputs the arithmetically operated results to the I/O port 20A. It should also be noted that the RAM 20D comprises a nonvolatile memory in which data used for the arithmetic operations are stored in a form of data map. Since the nonvolatile memory is used as the RAM 20D, the memory contents are held after the engine is stopped. For the ignition circuit 18 comprising a power transistor 19 is the same as that in first embodiment described above.

Next, an operation of the second preferred embodiment will be described below.

Figure 10:
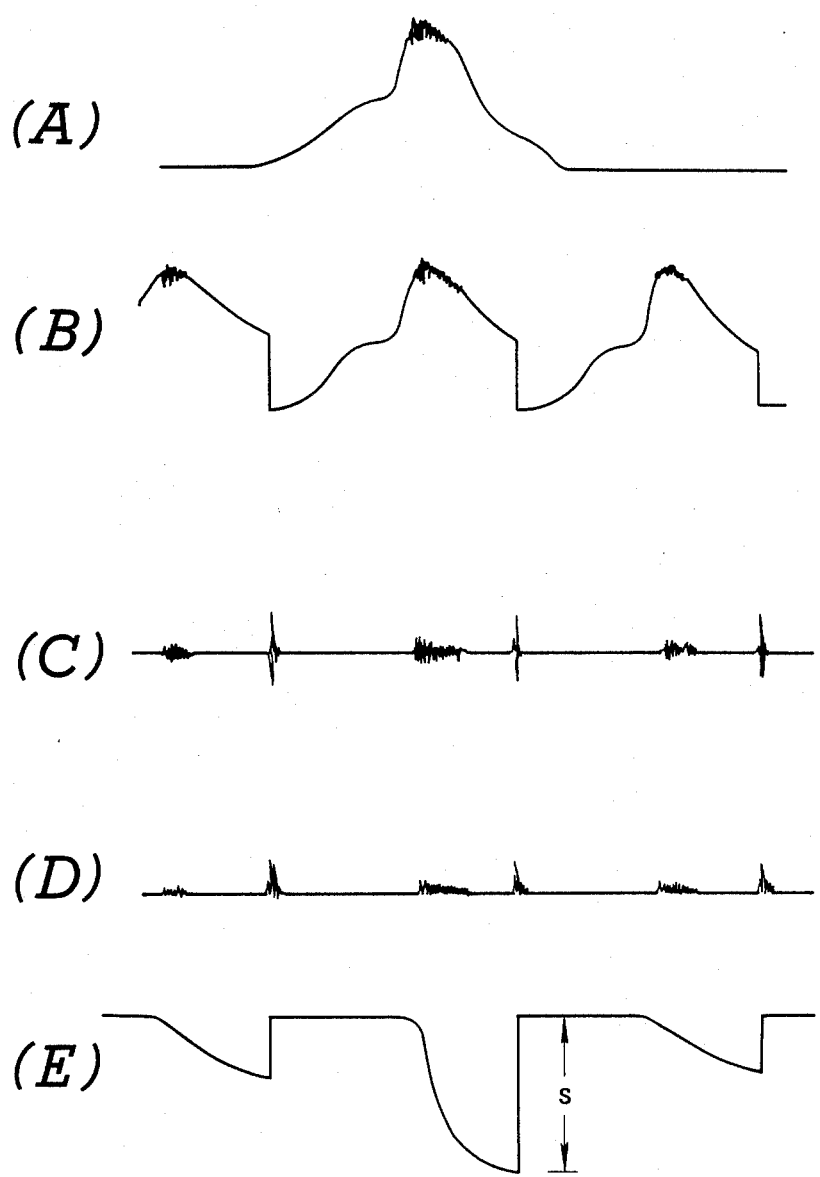
FIG. 10 is a waveform chart for explaining quantification means in the second preferred embodiment.

As shown in (A) of FIG. 10, the output signal waveform of the pressure-responsive sensor 1 is a waveform representing variation in pressure within the corresponding engine cylinder involved in its combustion on which a waveform representing a high-frequency knocking vibration is superposed. Hence, it is necessary to extract such a high-frequency signal waveform from a part of low-frequency pressure variation. In addition, since the high-frequency waveform further includes the background noise components, it is thus necessary to discriminate the knocking waveform from the intermixed high-frequency waveform.

In the second preferred embodiment, a first processing in which the high-frequency signal component is extracted from the low-frequency signal component waveform having a large amplitude involved in the combustion of air fuel mixture within the corresponding combustion chamber and the extracted high-frequency signal component is quantified is carried out by the quantifying means comprising charge amplifiers 2, band-pass filter 3, multiplexer 15, rectifier 16, and integrator 17. In addition, a second processing in which a series of operations, i.e., the knocking is discriminated from the high-frequency background noise and the ignition timing is controlled to avoid recurrence of knocking and to increase engine output torque and saving of fuel consumption on the basis of the discriminated knocking is carried out by the microcomputer 20.

First, the above-mentioned first processing method will be described below.

The output signal waveform of each pressure-responsive sensor 1 is a low-frequency signal caused by the combustion of fuel on which the high-frequency signal waveform is superposed as appreciated from (A) of FIG. 10. Such a low-frequency signal waveform of pressure vibration appears once for one stroke in the corresponding engine cylinder irrespectively of the occurrence of knocking. The charge amplifier 2 converts the output electric charge of the corresponding pressure-responsive sensor 1 into the corresponding voltage signal. The multiplexer (MPX)15 processes the converted voltage signal derived from the pressure-responsive sensor 1 installed in each cylinder in the time shared mode for each predetermined interval in units of crank angle (e.g., 120 degrees starting from 70 degrees before the top dead center (TDC) in the compression stroke and ending at 50 degrees after the top dead center in the expansion stroke) in accordance with a control command by the microcomputer 20. The output waveform from the multiplexer 15 is shown in (B) of FIG. 10.

The band-pass filter 3 then enables the passage of only the high-frequency wave signal components. Thus, the output waveform of the band-pass filter 3 is shown in (C) of FIG. 10.

The rectifier 16 rectifies a half wave of the output signal from the band-pass filter (BPF)3 as shown in (D) of FIG. 10. The half-wave rectified wave is then integrated by the integrator 17. The output waveform of the integrator 17 is shown in (E) of FIG. 10. In this way, the high-frequency-wave signal component is quantified. The change in pressure of the high-frequency wave due to the knocking or other causes can thus be extracted and quantified from the change in pressure within the respective cylinders due to the combustion.

It should be noted that a spike waveform having a large amplitude shown in (C) and (D) of FIG. 10 is produced due to a shock appearing during the exchange operation in the multiplexer (MPX)15.

Next, the second processing will be described below with reference to flowcharts shown in FIGS. 11 through 13(B) since the second processing is carried out by the microcomputer 20.

Figure 11:
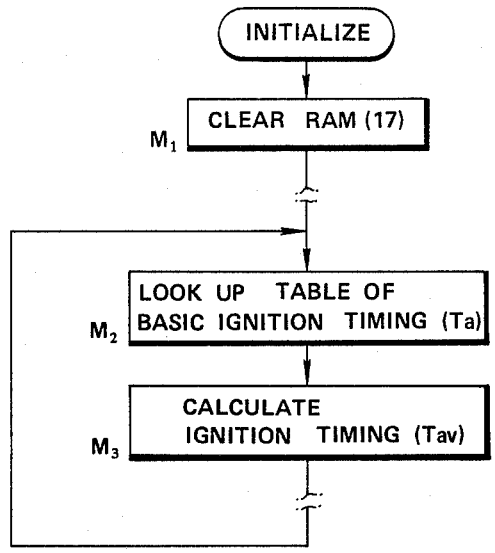
FIG. 11 through FIG. 13(B) are processing flowcharts on which a microcomputer shown in FIG. 9 executes, FIG. 11 being a flowchart of an initialization routine, FIG. 12 being a flowchart of an interrupt processing routine, FIGS. 13(A) and 13(B) being integrally a flowchart of an interrupt processing routine carried out at 50 degrees after an engine crankshaft rotational angle has reached a top dead center in a compression stroke.

FIG. 11 shows an initialize routine of the microcomputer 20 shown in FIG. 9. When an ignition switch of the engine is turned on, the CPU 20C clears the contents of the RAM 20D and sets initial data into the RAM 20D in a first step $M_1$. Next, the CPU 20C calculates other engine operating variables, e.g., an amount of fuel to be injected into the engine, etc., although such a calculation step is not shown in FIG. 11.

In a second step $M_2$, the CPU 20C searches data table stored in the ROM 20E for a basic ignition timing advance angle value Ta, e.g., on the basis of engine speed and engine load (or, preferably a basic injected quantity of fuel for a fuel injection valve) in a table look up technique. In the next step $M_3$, the CPU 20C corrects the basic ignition timing advanced angle value Ta on the basis of a current engine cooling water temperature from an engine cooling water temperature sensor (not shown in FIG. 9) so that an actual ignition timing angle Tav is derived.

Next, an interrupt processing routine shown in FIG. 12 will be described below.

Figure 12:
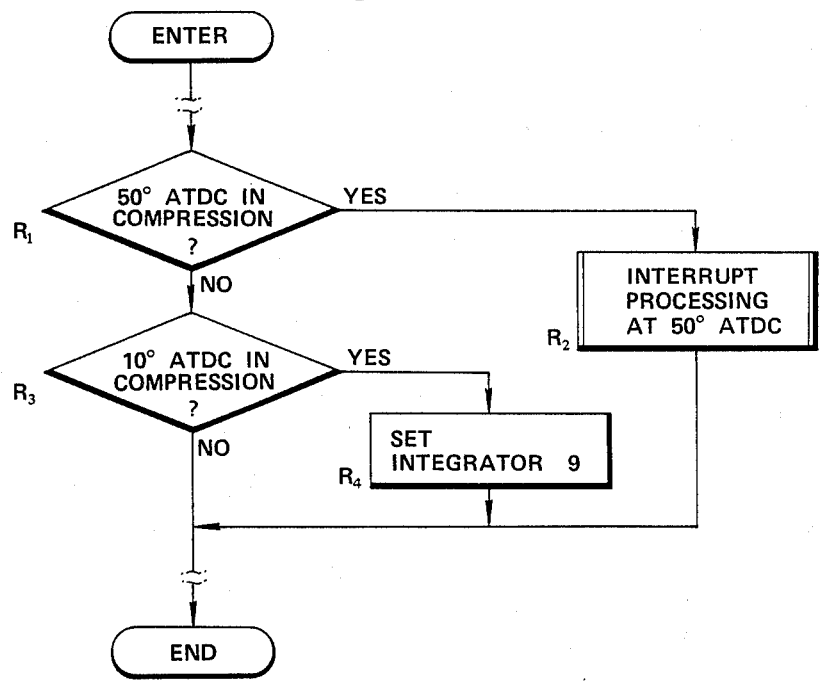

In FIG. 12, a step $R_1$ carries out such a processing that the CPU 20C determines whether the current crank angle is at 50 degrees after the top dead center (50° ATDC) in the compression stroke. If the crank angle is at 50° ATDC (YES) in the step $R_1$, the CPU 20C carries out an interrupt processing shown in FIGS. 13(A) and 13(B) in a step $R_2$.

If the crank angle is not at 50° ATDC (NO) in the step R₁, the routine goes to a step R₃ in which the CPU 20C determines whether the crank angle is at 10° after the top dead center (10° ATDC) in the compression stroke. If the crank angle is at 10° ATDC (YES) in the step R₃, the routine goes to a step R₄, wherein the CPU 20C issues a command to the integrator 17 via the I/O port 20B to start integration of the output signal from the rectifier 16.

The interrupt processing routine at 50° ATDC will be described below with reference to FIG. 12.

Figure 14:
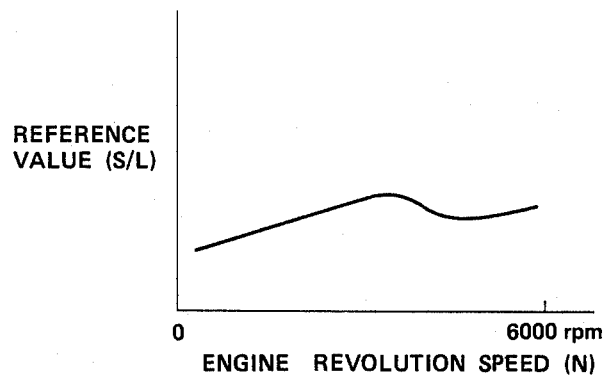
FIG. 14 is a data table of a reference value previously stored in a ROM of a microcomputer shown in FIG. 9, the reference value being varied according to the engine revolution speed.

In a step $P_1$, the CPU 20C determines which order of the engine cylinder the crank angle is at 50° ATDC from the output signal derived from the crank angle sensor, i.e., the CPU 20C carries out an identification of one of the engine cylinders. In a step $P_2$, the CPU 20C issues a command to the A/D converter 20A to convert the output value of the integrator 17 which is integrated from the half-wave rectified signal associated with the identified engine cylinder into the corresponding digital value. In a step $P_3$, the CPU 20C stores the result of integration S of the integrator 17 into an address of the RAM 20D corresponding to the cylinder number n as data Sn on the cylinder number n. In a step $P_4$, the CPU 20C calculates a difference value DSn ($DSn = Sn - SAn$), wherein SAn denotes a weight mean value to be described later. In a step $P_5$, the CPU 20C searches for a reference value S/L stored in the ROM 20E in the table look up technique. The reference value S/L is stored previously in the ROM 20E and is extracted according to the measured engine revolution speed N when the engine revolution speed N is measured. The reference value S/L, for example, is represented by a two-dimensional graph shown in FIG. 14.

In the next step $P_6$, the CPU 20C compares the calculated difference value DSn with the searched reference value S/L. If $DSn \leq S/L$ in the step $P_6$, the CPU 20C determines that no knocking has occurred and the routine goes to a step $P_7$, wherein the CPU 20C in turn compares the difference value DSn with a value of the reference value S/L which is multiplied by ½, i.e., $\frac{1}{2} \times S/L$. If $DSn \geq \frac{1}{2} \times S/L$ in the step $P_7$, the routine goes to a step $P_8$. If $DSn < \frac{1}{2} \times S/L$, the routine goes to a step $P_9$, wherein a correction value, i.e., Tcn for the ignition timing advanced angle value for the identified engine cylinder is calculated in such an equation as $Tcn = Tcn - K_1$ ($K_1$ denotes a constant number of crank angle, e.g., 0.5° through 0.2°) so that the ignition timing advanced angle value Tav is slightly increased to a more advanced angle side since a final ignition timing value Tavn is defined as $Tavn = Tav - Tcn$ to be described later.

On the other hand, if $DSn > S/L$ in the step $P_6$, the CPU 20C determines that the knocking has occurred and the routine goes to a step $P_{10}$, wherein the difference value DSn is compared with a multiplied value, i.e., the reference value S/L which is multiplied by four expressed as $4 \times S/L$ in order to determine a level (intensity) of knocking.

If $DSn \leq 4 \times S/L$, the CPU 20C determines that the level of knocking is not so large and the routine goes to a step $P_{11}$, wherein the correction value Tcn of the ignition timing advanced angle value Tav is calculated in such a way as $Tcn = Tcn + K_2$ ($K_2$ denotes a constant number of crank angle, e.g., about one degree) so that the ignition timing advanced angle value Tav is correspondingly decreased to a retardation angle side.

If $DSn > 4 \times S/L$, the CPU 20C determines that the level of knocking is considerably large and the routine goes to a step $P_{12}$, wherein the correction value Tcn is calculated as $Tcn = Tcn + K_3$ ($K_3$ denotes a constant number of crank angle, e.g., about two degrees through four degrees) so that the ignition timing advanced angle value Tav is considerably decreased to the retardation angle side.

In this way, the ignition timing advanced angle value Tav is controlled in accordance with the level of knocking.

After any one of the steps $P_7$, $P_9$, $P_{12}$, and $P_{13}$ is passed, the routine goes to a step $P_8$, wherein the CPU 20C determines whether the correction value Tcn indicates a negative value. If $Tcn < 0$ (negative value), the routine goes to a step $P_{13}$, wherein the correction value Tcn is zeroed ($Tcn = 0$) in order to prevent the fuel consumption and exhaust characteristic from being reduced due to an excessively advanced ignition timing since the negative value of the correction value means the addition of an angle value to the ignition timing advance angle value Tav.

If $Tcn \geq 0$ in the step $P_{12}$, the routine goes to a step $P_{14}$, wherein the CPU 20C, in turn, compares the correction value Tcn with an upper limit value UL. If $Tcn > UL$ in the step $P_{14}$, the routine goes to a step $P_{15}$, wherein the correction value Tcn is set to the upper limit UL ($Tcn = UL$) to prevent an excessive retardation of the ignition timing. It should be noted that a value of the upper limit UL is preferably set to about 10° through 20° with an influence on the engine output power, etc., taken into consideration and at that ignition timing the engine knock will not recur any more.

After either of the steps $P_{14}$ or $P_{15}$ is passed, the routine goes to a step $P_{16}$, wherein the CPU 20C calculates the above-mentioned weight mean value SAn as follows:

$$SAn = Sn \times 1/16 + SAn \times 15/16 \qquad (1)$$

It should be noted that since a general formula of the weight mean is expressed as $SAn = Sn \times (n-k)/n + k/n \cdot SAn$, $n = 16$ and $k = 15$ are used in this embodiment.

Figure 13A:
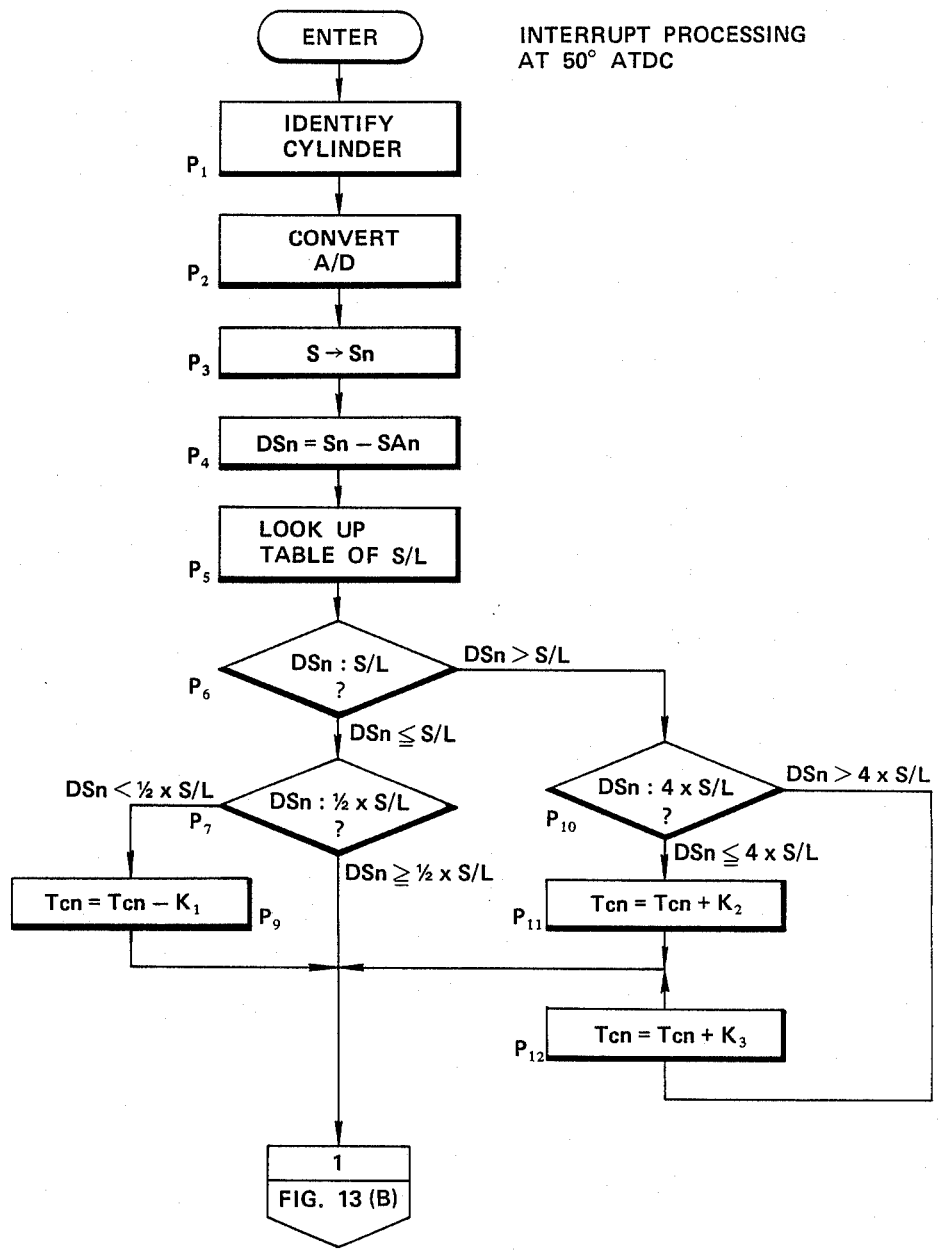
Figure 13B:
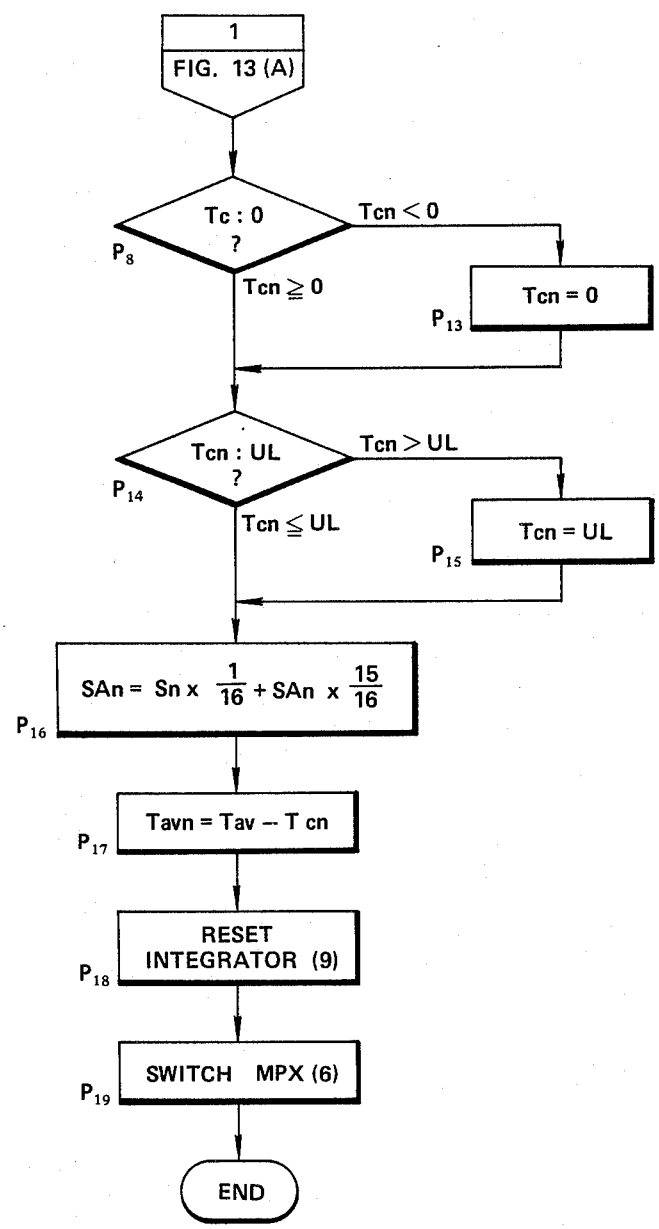

As appreciated from the above equation (1), even when the data Sn during the current execution of the flowchart shown in FIGS. 13(A) and 13(B) indicates a large value (the level of knocking is considerably large), the weight mean value is not so largely varied. Therefore, the weight mean value SAn can be set lower even if the background noise of a high level continues for a long duration. The knocking can, thus, accurately be detected through the comparison of the difference value DSn calculated in the step $P_4$ with the reference value S/L derived in the step $P_5$.

In a step $P_{17}$, the CPU 20C calculates the final ignition timing advance angle value Tavn for the identified engine cylinder in the following equation.

$$Tavn = Tav - Tcn \qquad (2)$$

In the equation (2), Tav is the basic ignition timing advanced angle value obtained in the initializing routine shown in FIG. 11.

In the next step $P_{18}$, the CPU 20C issues a command to the integrator 17 via the I/O port 20B to reset the integrator 17. In a step $P_{19}$, the CPU 20C issues a command to the multiplexer 15 via the I/O port 20B to change the input signal from one of the pressure-responsive sensors 1 which is associated with one of the engine cylinders to be identified next.

In this way, the interrupt processing routine shown in FIGS. 13(A) and 13(B) is carried out for each engine cylinder and, therefore, the ignition timing control can separately be carried out for each cylinder.

The above-described operation of the microcomputer 20 will be described with reference to FIGS. 15 through 17.

Figure 15:
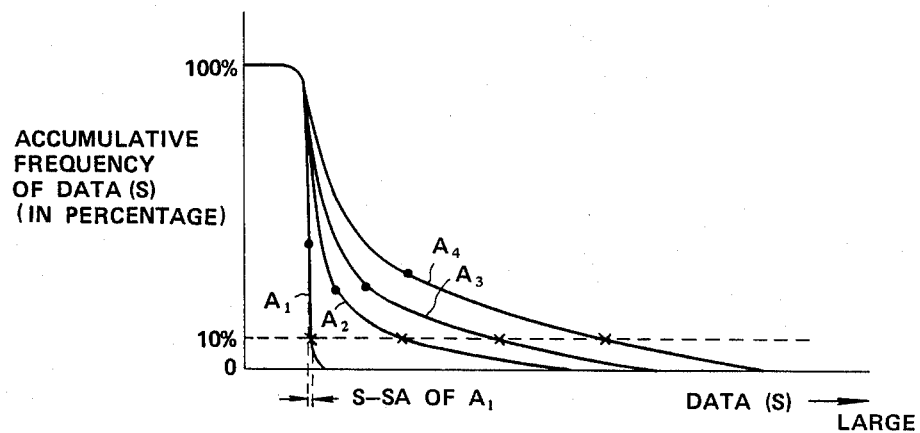
FIG. 15 is a graph representing a relationship between the level of data S and accumulative frequency of detected data S in percentage.

The relationship between the level of data S digitially converted by means of the A/D converter 20A and accumulative frequency of data S in percentage is such that the variation of data S becomes large as the level of knocking increases as shown in FIG. 15 when the level of knocking pattern changes in four stages ($A_1$, $A_2$, $A_3$, $A_4$) from no knocking to a most significant level of knocking. In FIG. 15, marks X indicate intensities of data S which correspond to 10% of the most frequently appearing level of data S for each level stage of knocking (hereinafter referred to as 10%S). The 10%S is a measure for selecting the above-described reference value S/L in order to carry out a stable knocking control.

Figure 16:
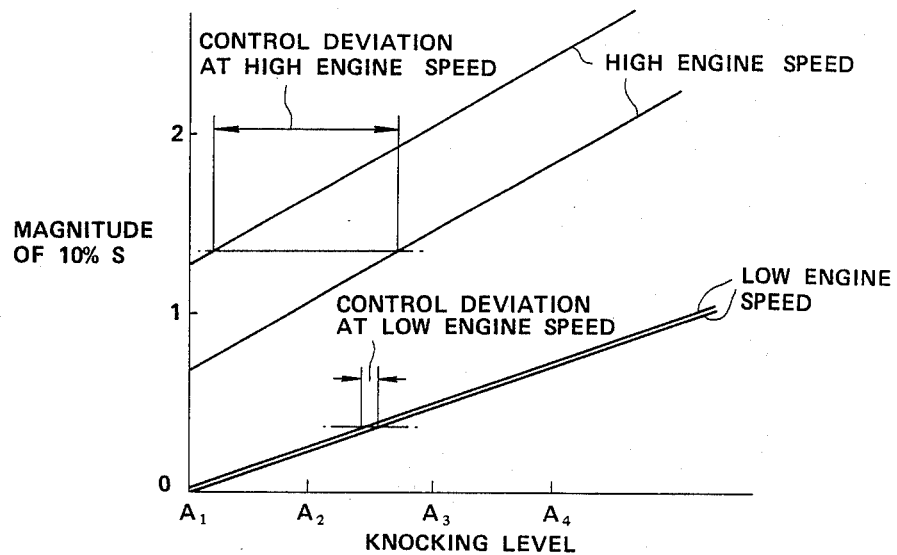
FIG. 16 is a graph representing a relationship between the accumulative frequency of 10% of the detected data S and each pattern of knocking shown in FIG. 15.
Figure 17:
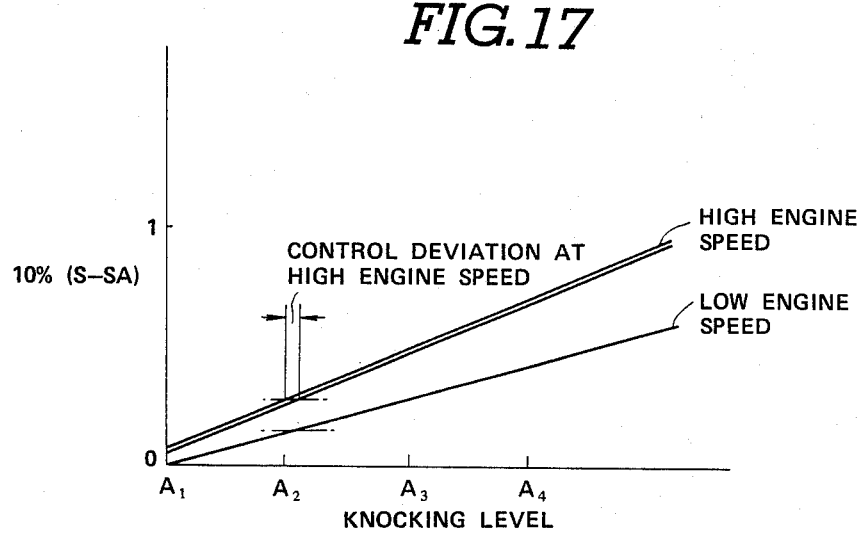
FIG. 17 is a graph representing a relationship between the accumulative frequency of 10% of a difference (S−SA) shown in FIG. 15.

In addition, the 10%S indicates such a characteristic as passing substantially through an origin of FIG. 16 when the engine revolution speed is low, whereas the level of 10%S has a large variation width even in the same level stage of knocking and the level of data S indicates a large value even in the stage $A_1$ in a non knocking state when the engine revolution speed is high, as shown in FIG. 16. Hence, as in the above-identified conventional system, the occurrence of knocking cannot accurately be detected even if a value of the data S which is multiplied by a constant number is compared with a reference value. However, as shown in FIG. 17, since a 10% value (10%(S−SA)) of the data S from which the weight mean value SA is subtracted (S−SA) has a narrow variation width even when the engine revolution speed is high and indicates such a characteristic as passing substantially through the origin of FIG. 17. Therefore, if the 10% value is compared with the reference value S/L, the knocking can be discriminated from the background noise so that an accurate detection of knocking can be achieved.

Figure 18:
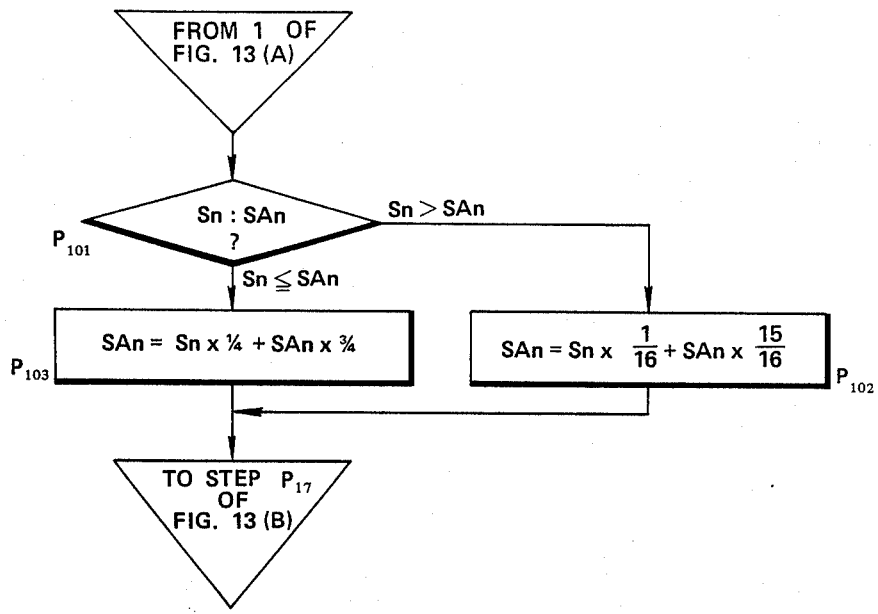
FIG. 18 is a processing flowchart for an operation of a third preferred embodiment which is integral with the flowchart shown in FIGS. 13(A) and 13(B)

FIG. 18 integrally a flowchart in a third preferred embodiment. It should be noted that the construction of the third embodiment is the same as that of the second embodiment shown in FIG. 9. In addition, since the steps from step $P_1$ to step $P_{14}$ and from step $P_{17}$ to end are the same contents of those of the second embodiment shown in FIGS. 13(A) and 13(B), the detailed description of these steps is omitted here.

After any one of the steps $P_7$, $P_9$, $P_{11}$, and $P_{12}$ is passed, the routine goes to a step $P_{101}$, wherein the data Sn is compared with the weight mean value SAn. If Sn≦SAn, the routine goes to a step $P_{103}$, wherein the weight mean value SAn is calculated as follows:

$$SAn = Sn \times (\tfrac{1}{4}) + SAn \times (\tfrac{3}{4}) \qquad (3)$$

If Sn>SAn in the tep $P_{101}$, the routine goes to a step $P_{102}$, wherein the weight mean value SAn is calculated as $SAn = Sn \times 1/16 + SAn \times 15/16$ in the same way as the second embodiment.

That is to say, if the data Sn is larger than the weight mean value SAn calculated during the execution of the same previous routine (Sn>SAn), the influence of data Sn on the calculation of SAn is reduced. If the data Sn is equal to or smaller than the weight mean value SAn (Sn≦SAn), the data Sn affects largely the calculation of the weight mean value SAn. Consequently, when the weight mean value SAn shifts to a larger value, the weight mean value SAn is shifted slowly to indicate that larger value. On the other hand, when the weight mean value SAn shifts to a smaller value, the weight mean value SAn is shifted quickly to indicate that smaller value. Therefore, since the weight mean value SAn in the third preferred embodiment can be set lower than that SAn in the case of the second preferred embodiment which is denoted by a dot-and-dash line in FIG. 19, the weight mean value SAn in the third embodiment being denoted by a broken line in FIG. 19. The sensitivity of detecting the occurrence of knocking can be improved.

Figure 20:
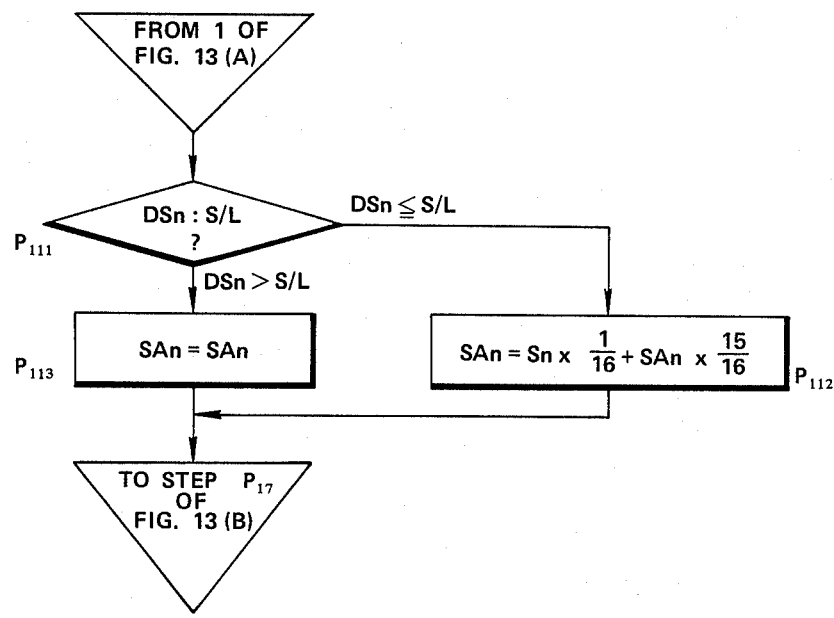
FIG. 20 is a processing flowchart of a fourth preferred embodiment which is integral with the flowchart shown in FIGS. 13(A) and 13(B)

FIG. 20 shows a processing flowchart of a fourth preferred embodiment.

Since the steps from the step $P_1$ to the step $P_{14}$ and from the step $P_{17}$ to end are the same contents as those in the second and third preferred embodiments, the detailed description of these steps is omitted here.

After any one of the steps $P_7$, $P_9$, $P_{11}$ has passed, the routine goes to a step $P_{111}$, wherein the difference value DSn is compared with the reference value S/L. If DSn≦S/L, the CPU 20C determines no occurrence of knocking and the routine goes to a step $P_{112}$, wherein the weight mean value SAn is calculated in accordance with the above-described expression (1); i.e., $SAn = Sn \times 1/16 + SAn \times 15/16$.

If DSn>S/L, the CPU 20C determines the occurrence of knocking and that the data Sn is not used for calculation of the weight mean value SAn. In a step $P_{113}$, the present weight mean value SAn uses the previously calculated weight mean value SAn without using the present data S.

Figure 19:
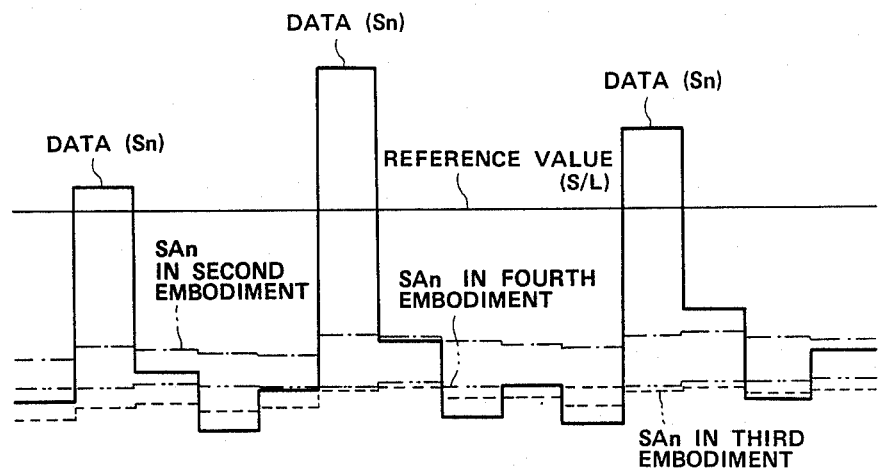
FIG. 19 is an explanatory view of a weight mean value SAn in each of the second and third preferred embodiments together with a reference value S/L and data Sn.

Hence, the weight mean value SAn can be set to a yet lower value since the large value of data S does not affect the calculation of SAn as shown in a phantom line of FIG. 19.

The sensitivity of detecting the occurrence of knocking can more remarkably be improved.

Figure 21:
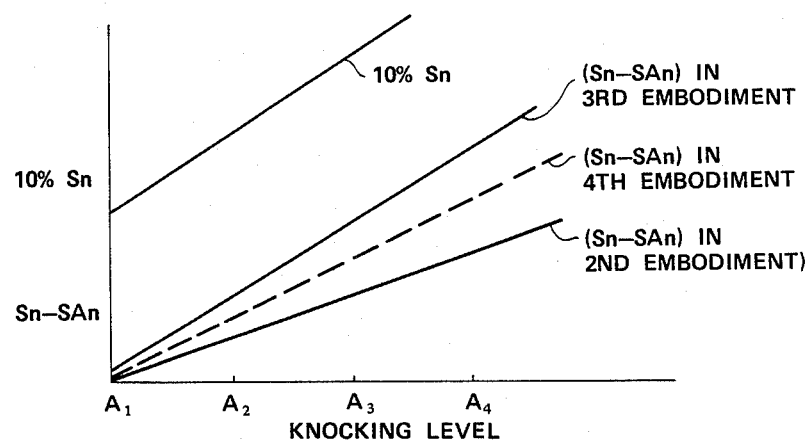
FIG. 21 is a graph representing a relationship between a difference value DSn ($DSn = Sn - SAn$) of each of the second, third, and fourth preferred embodiments, the accumulative frequency of 10% of Sn, and each pattern of knocking shown in FIG. 15.

If the difference values DSn in the second, third, and fourth preferred embodiments are compared with each other, respective inclinations of the difference values DSn become larger in such an order as those in the second, fourth, and third embodiments as shown in FIG. 21. Therefore, if one of the cylinders generates suddenly a small level of knocking ($A_2$) a single time under the condition ($A_1$) of no occurrence of knocking, the sensitivity of detecting knocking becomes higher in the order of those in second, fourth, and third embodiments.

In FIG. 21, $A_1$ through $A_4$ are the same symbols as used in FIG. 15.

Although the difference value DSn between the data Sn and weight mean value SAn is compared with the reference value S/L in order to determine the level of knocking in each embodiment, the same determination of the level of knocking may be made in a case when an addition of the data Sn to the weight mean value SAn is compared with another predetermined reference value S/L. In addition, although the ignition timing is changed (retarded) to avoid recurrence of knocking, another method of avoiding recurrence of knocking may be used.

As described hereinabove, since in the system and method for detecting and controlling the engine knocking according to the present invention, the determination of occurrence of the engine knocking is based on a present quantity data on the detected pressure vibration energy within an engine cylinder and a value associated with a previous quantity data on the detected pressure vibration energy, the accurate detection of knocking can always be achieved irrespectively of such factors as the kind of engine, the mounting state of the pressure-responsive sensor, and engine operating conditions. In addition, since in the system and method according to the present invention, the knocking can accurately be discriminated from the high-frequency background noise even when the engine revolution speed is high. Furthermore, the ignition timing is retarded when the occurrence of knocking is detected and a retard angle is varied according to the level of knocking. Consequently, the recurrence of knocking can accurately be avoided irrespectively of engine operating conditions.

Since in the third and fourth embodiments the smoothed value can be set to a smaller value, the sensitivity of detecting knocking can more remarkably be improved.

It will clearly be understood by those skilled in the art that the foregoing description is made in terms of the preferred embodiments and various changes and modifications may be made without departing from the scope of the present invention, which is to be defined by the appended claims.

What is claimed is:

1. A system for detecting and controlling knocking in an internal combustion engine, comprising:
   (a) first means for detecting pressure vibration energy within an engine combustion chamber of an engine cylinder and deriving quantity data indicative of the detected pressure vibration energy, said quantity data being in terms of predetermined crankshaft rotational angular ranges in which knocking would occur and in which knocking would not occur; and
   (b) second means for determining the occurrence of knocking in said engine cylinder by comparing comparison data and comparison reference data, said second means deriving at least one of said comparison data and said comparison reference data from a present value of said quantity data corresponding to a rotational angular range in which knocking would occur and from a previous value of said quantity data corresponding to a rotational range in which no knocking would occur.

2. The system according to claim 1, wherein said rotational angular range in which knocking would occur comprises a first predetermined interval before top dead center in a compression stroke and the rotational angular range in which knocking would not occur comprises a second predetermined interval after top dead center.

3. The system according to claim 2, wherein said comparison data comprises a ratio value derived from a present value of the quantity data corresponding to the first predetermined interval before the top dead center and from a present value of the quantity data corresponding to the second predetermined interval after the top dead center and the comparison reference data comprises a reference value associated with the ratio value.

4. The system according to claim 3, wherein the reference value associated with the ratio value is a weighted mean of several ratio values.

5. The system according to claim 3, wherein the reference value associated with the ratio value is an average value of the ratio value at a latest predetermined engine cycle.

6. The system according to claim 3, wherein the reference value associated with the ratio value is an average of the present value of the quantity data of the detected vibration pressure energy for the first predetermined interval before top dead center at a latest predetermined engine cycle.

7. The system according to claim 3, wherein the reference value associated with the ratio value is a weighted mean of the present value of the quantity data of the detected vibration pressure energy for the first predetermined interval before top dead center at a latest predetermined engine cycle.

8. The system according to claim 2, wherein said comparison data comprises a difference value derived from the previous value of the quantity data corresponding to the second predetermined interval and the present value of the quantity data corresponding to the first predetermined interval before the top dead center and the comparison reference data comprises a reference value associated with the difference value.

9. The system according to claim 8, wherein the reference value is a weighted mean of several difference values.

10. The system according to claim 2, wherein said comparison data comprises a ratio of a difference value to a present value of the quantity data corresponding to the first predetermined interval before top dead center and the comparison reference data comprises a reference value associated with the ratio value, the difference value being between a present value of the quantity data for the first and second predetermined intervals.

11. The system according to claim 10, wherein the reference value is a weighted mean of several ratio values.

12. The system according to claim 2, wherein said first means comprises:
    third means for detecting vibration pressure within the combustion chamber and outputting a signal indicative thereof; and
    fourth means for rectifying and integrating the output signal of said third means so as to provide values corresponding to the pressure vibration energies within the combustion chamber for the first predetermined interval before top dead center and for the second predetermined interval after top dead center.

13. The system according to claim 1, wherein said comparison data comprises a difference between a present value of the quantity data of the detected vibration pressure energy for a predetermined interval which includes said rotational angular range in which knocking would occur and said rotational angular range in which knocking would not occur and from a weighted mean which includes previous values of said quantity data for said predetermined interval and said comparison reference data comprises a reference value.

14. The system according to claim 13, wherein said reference value is varied according to an engine operating condition.

15. The system according to claim 13, which further comprises third means for determining a level of the knocking when the difference exceeds the reference value.

16. The system according to claim 15, wherein said third means compares the difference with the reference value multiplied by a predetermined number so as to determine the level of knocking.

17. The system according to claim 16, wherein the predetermined number is four.

18. The system according to claim 16, which further comprises fourth means for retarding an ignition advance angle value by a predetermined angle, the predetermined angle being changed according to the result of a determination of the level of knocking in said third means.

19. The system according to claim 13, wherein a denominator of the weighted mean is sixteen.

20. The system according to claim 13, wherein a denominator of the weighted mean is four.

21. The system according to claim 13, wherein the present weighted mean is equal to the previous weighted mean.

22. The system according to claim 1, wherein said comparison data comprises an addition of a present value of said quantity data of the detected vibration pressure energy for a predetermined interval which includes said rotational angular range in which knocking would occur and said rotational angular range in which knocking would not occur to a weighted mean of previous values of said quantity data for said predetermined interval and wherein said comparison reference data comprises a reference value.

23. A method for detecting and controlling engine knocking, comprising the steps of:
(a) detecting pressure vibration energy within an engine combustion chamber of an engine cylinder and deriving quantity data indicative of the detected pressure vibration energy, said quantity data being in terms of predetermined crankshaft rotational angular ranges in which knocking would occur and in which knocking would not occur;
(b) detecting combustion pressure vibration energy using the quantity data derived in said step (a); and
(c) determining the occurrence of knocking by comparing comparison data and comparison reference data, at least one of said comparison data and said comparison reference data being derived from a present value of said quantity data corresponding to a rotational angular range in which knocking would occur and from a previous value of said quantity data corresponding to a rotational range in which no knocking would occur.

24. A system, comprising:
(a) means for detecting pressure vibration energy within an engine combustion chamber of an engine cylinder and deriving first quantity data indicative of the detected pressure vibration energy corresponding to a first crankshaft rotational angular range in which knocking would occur and deriving second quantity data indicative of the detected pressure vibration energy corresponding to a second rotational angular range in which knocking would not occur; and
(b) means for determining the occurrence of knocking in said engine cylinder by distinguishing between said first quantity data and said second quantity data and determining a relationship between said first quantity data and said second quantity data indicative of knocking.

25. A method, comprising:
(a) detecting pressure vibration energy within an engine combustion chamber of an engine cylinder and deriving first quantity data indicative of the detected pressure vibration energy corresponding to a first predetermined crankshaft rotational angular range in which knocking would occur and deriving second quantity data indicative of the detected pressure vibration energy corresponding to a second rotational angular range in which knocking would not occur; and
(b) determining the occurrence of knocking in said engine cylinder by distinguishing between said first quantity data and said second quantity data and determining a relationship between said first quantity data and said second quantity data indicative of knocking.

* * * * *